United States Patent [19]

Lee

[11] Patent Number: 5,723,544
[45] Date of Patent: Mar. 3, 1998

[54] POLYOLEFIN IONOMER AS PROCESSING AID FOR THERMOPLASTIC POLYURETHANE

[75] Inventor: Bin Lee, Coraopolis, Pa.

[73] Assignee: Bayer Corporation, Pittsburgh, Pa.

[21] Appl. No.: 775,988

[22] Filed: Jan. 3, 1997

Related U.S. Application Data

[63] Continuation of Ser. No. 879,660, May 6, 1992, abandoned.

[51] Int. Cl.$^6$ .................................................. C08L 75/06
[52] U.S. Cl. ...................... 525/130; 524/507; 524/562; 524/590; 525/127
[58] Field of Search .............................. 524/507, 590, 524/562; 525/127, 130

[56] References Cited

U.S. PATENT DOCUMENTS

| | | | |
|---|---|---|---|
| 3,402,135 | 9/1968 | Schwartz et al. | 524/322 |
| 4,179,479 | 12/1979 | Carter, Jr. | 525/66 |
| 4,238,574 | 12/1980 | Megna | 525/130 |
| 4,410,595 | 10/1983 | Matsumoto et al. | 428/412 |
| 4,412,040 | 10/1983 | Albee, Jr. et al. | 525/143 |
| 4,423,185 | 12/1983 | Matsumoto et al. | 525/66 |
| 4,657,970 | 4/1987 | Shiraki et al. | 525/57 |
| 4,674,751 | 6/1987 | Molitor et al. | 525/130 |
| 4,766,174 | 8/1988 | Statz | 525/64 |
| 4,883,837 | 11/1989 | Zabrocki | 525/66 |
| 4,906,687 | 3/1990 | Modic | 525/57 |

*Primary Examiner*—Rabon Sergent
*Attorney, Agent, or Firm*—Joseph C. Gil; Aron Preis

[57] ABSTRACT

A thermoplastic molding composition is disclosed comprising (i) a thermoplastic polyurethane resin and (ii) an ionomer. The ionomer is a salt of a copolymer, having a weight average molecular weight of 1,000 to 200,000, of 70 to 99 percent olefin and about 1 to 30 percent of alpha, beta-ethylenically unsaturated carboxylic acid. At least some of said carboxylic acid is neutralized by a monovalent counterion. The composition is characterized by its improved processability.

8 Claims, No Drawings

POLYOLEFIN IONOMER AS PROCESSING AID FOR THERMOPLASTIC POLYURETHANE

This application is a continuation of application Ser. No. 07/879,660 filed May 6, 1992 now abandoned.

FIELD OF THE INVENTION

The Invention relates to molding compositions containing thermoplastic polyurethane and more particularly to a composition having improved processibility containing an ionic polyethylene.

SUMMARY OF THE INVENTION

A thermoplastic molding composition is disclosed comprising (i) a thermoplastic polyurethane resin and (ii), about 0.1 to 5 percent, relative to the total weight of the composition, of an ionomer. The ionomer is a salt of a copolymer, having a weight average molecular weight of 1,000 to 200,000, of 70 to 99 percent olefin and about 1 to 30 percent of alpha, beta-ethylenically unsaturated carboxylic acid. At least some of said carboxylic acid is neutralized by a monovalent counter-ion. The composition is characterized by its improved processability.

BACKGROUND OF THE INVENTION

Thermoplastic polyurethane resins are well known and have long been available in commerce. In the preparation of these resins, a high molecular weight organic compound containing active hydrogen atoms, such as a polyester, a polyether or the like, is reacted with an organic isocyanate, optionally also with a chain extending agent such as an amine, glycol, water or the like to produce an elastomer. The reaction product may be fabricated into a final desired shape by any of a variety of techniques. In one case the reaction composition can be mixed together simultaneously or in steps and then immediately cast into a mold having the desired configuration. Alternatively, the reaction composition can be mixed either simultaneously or in steps, permitted to react for a short time and then by interrupting the reaction, a pseudo thermoplastic results which can be fabricated by any of the techniques suitable in the thermoplastic art. In still another method, an interpolymer, generally referred to as millable gum, can be prepared and this gum worked on a mill such as that used in the rubber industry, whereupon additional ingredients and reactants, such as pigments, fillers and further quantities of curing agents such as polyisocyanates, sulfur, peroxides or the like can be added in order to effect a cure. In all these processes where the reaction mixture is subjected to subsequent shaping techniques, and where particularly, thermoplastic techniques are used, polyurethane In general, do not always exhibit good processing characteristics. For example, extrusion and injection molding techniques are sometime difficult to use for shaping or molding desired articles. Necessarily, the art has looked to various techniques of improving the processing of thermoplastic polyurethane elastomers.

The relevant patent literature is noted to include U.S. Pat. No. 4,179,479 which disclosed a polyurethane composition containing an acrylic polymer as a processing aid. Fatty acids have been disclosed in U.S. Pat. No. 3,402,135 to aid the processing of urethane crude rubber. Also relevant is the disclosure in U.S. Pat. No. 4,657,970 which disclosed a modified block copolymer composition comprising a thermoplastic polymer and a modified block copolymer consisting essentially of a base block copolymer containing an olefin compound polymer block having a degree of ethylenic unsaturation. Thermoplastic polyurethanes are referred to as are ionomers. Improved mechanical properties of certain rubbery compositions were reported in U.S. Pat. No. 4,906,687 to result upon the incorporation therewith of a modified block copolymers, including ionomers. U.S. Pat. No. 4,766,174 disclosed melt processible blends containing polyurethane and an aluminum ionomer. U.S. Pat. No. 4,883,837 is noted for the disclosure of a compatible composition containing a polyolefin, a thermoplastic polyurethane and a modified polyolefin. The modified polyolefin which may contain functional carboxylic acid groups, may be a salt formed from the neutralization of these groups with certain metal ions.

Also noted in the present context is U.S. Pat. No. 4,238,574 which disclosed blends of thermoplastic polyurethane elastomer and a neutralized ionic polymer of ethylene/carboxylic acid copolymer. The compositions thus disclosed are said to be suitable for blow molding at conventional blow molding temperatures. A polymer lubricant comprising a copolymer salt of a low molecular weight acid of alpha olefin and an alpha, beta ethylenically unsaturated carboxylic acid has been disclosed in U.S. Pat. No. 4,412,040. The copolymer is at least partially neutralized by a metal cation. The lubricant is said to be suitable for improving the processability of a variety of polymers.

DETAILED DESCRIPTION OF THE INVENTION

The thermoplastic polyurethanes usable in the instant invention are those used and generally known in the art.

Suitable thermoplastic polyurethanes useful in the invention are those prepared from a diisocyanate, a polyester or polyether polyol and a chain extender. These thermoplastic polyurehtanes are those which are substantially linear and maintain thermoplastic processing characteristics.

The thermoplastic polyurethanes may be synthesized by methods disclosed e.g. in U.S. Pat. No. 3,214,411 incorporated herein by reference. A particularly useful polyester resin used as a starting material for thermoplastic polyurethane are those produced from adipic acid and a glycol having a at least one primary hydroxyl group. The adipic acid is condensed with a suitable glycol or mixture of glycols which have at least one primary hydroxyl group. The condensation is stopped when an acid number of from about 0.5 to about 2.0 is reached. The water formed during the reaction is removed simultaneously therewith or subsequently thereto such that the final water content is from about 0.005 to about 0.02% preferably from about 0.005 to 0.01%.

Any suitable glycol may be used in reaction with the adipic acid such as, for example, ethylene glycol, propylene glycol, butylene glycol, hexanediol, bis-(hydroxymethyl-cyclohexane), 1,4-butanediol, diethylene glycol, 2,2-dimethyl propylene glycol, 1,3-propylene glycol and the like. In addition to the glycols, a small amount of trihydric alcohol up to about 1% may be used along with the glycols such as for example, trimethlolpropane, glycerine, hexanetriol and the like. The resulting hydroxyl polyester has a molecular weight of at least about 600, a hydroxyl number of about 25 to about 190 and preferably between about 40 and about 60, and an acid number of between about 0.5 and about 2 and a water content of 0.005 to about 0.01%.

The organic diisocyanate to be used in the preparation of the elastomer is preferably 4,4'-diphenylmethane diisocyanate. It is desired that the 4,4'diphenylmethane diisocyanate contain less than 5% of 2,4'-diphenylmethane diisocyanate and less than 2% of the 2,2'-dimer of diphenylmethane diisocyanate. It is further desired that the acidity calculate as HCl is from about 0.0001 to about 0.02%. The acidity calculated as percent HCl is determined by extracting the chloride from the isocyanate in a hot aqueous methanol solution or by liberating the chloride ion concentration present.

Other diisocyanates may be used in preparing the thermoplastic processable polyurethanes such as ethylene diisocyanate, propylene diisocyanate, butylene diisocyanate, cyclopentlylene-1,3-diisocyanate, cylohexylene-1,4-diisocyanate, cyclohexylene-1,2-diisocyanate, 2,4-tolylene diisocyanate, 2,6-tolylene diisocyanate, 2,2-diphenylpropane-4,4'-diisocyanate, p-phenylene diisocyanate, m-phenylene diisocyanate, xylylene diisocyanate, 1,4-naphthylene diisocyanate, azobenzene-4,4-'diisocyanate, diphenyl sulfone-4,4'-diisocyanate, dichlorohexamethylene diisocyanate, tetramethylene diisocyanate, pentamethylene diisocyanate, hexamethylene diisocyanate 1-chlorobenzene- 2,4-diisocyanate, furfurylidene diisocyanate and the like. If desirable, a small amount not grater than 1 wt. % of a polyfunctional isocyanate may be utilized.

Any suitable chain extending agent having active hydrogen containing groups reactive with isocyanate groups may be used such as, for example, diols including ethylene glycol, propylene glycol, butylene glycol, 1,4-butanediol, butanediol, butynediol, xylylene glycols, amylene glycols, 1,4-phenylene-bis-β-hydroxy ethyl ether, 1,3-phenylene-bis-β-hydroxy ethyl ether, bis-(hydroxy-methyl-cyclohexane), hexanediol, thiodiglycol and the like; diamines including ethylene diamine, propylene diamine, butylene diamine, hexamethylene diamine, cyclohexalene diamine, phenylene diamine, tolylene diamine, xylylene diamine, 3,3'-dichlorobenzidine, 3,3'-dinitrobenzidine and the like; alkanol amines such as, for example, ethanol amine, aminopropyl alcohol, 2,2-dimethyl propanol amine, 3-aminocyclohexyl alcohol, p-aminobenzyl alcohol and the like. The difunctional chain extenders mentioned in U.S. Pat. Nos. 2,620,516, 2,621,166 and 2,729,618 incorporated herein by reference may be used. If desirable, a small amount of polyfunctional material may be utilized. This polyfunctional chain extender, however, should not be present in an amount greater than about 1% by weight. Any suitable polyfunctional compound may be used in this application such as for example, glycerine, trimethylolpropane, hexanetriol, pentaerythritol and the like.

In accordance with the process of this invention, the polyester, the organic diisocyanate and the chain extender may be individually heated preferably to a temperature of from about 60° C. to about 135° C. and then the polyester and chain extender are substantially simultaneously mixed with the diisocyanate. In yet another process—a two-step prepolymer route—there is reacted in the first step a polyol with a diisocyanate to form an isocyanate-terminated prepolymer. The prepolymer is then chain extended to form a high molecular weight polymer in any mixer suitable in the thermoplastic art. More often, the polymer is fed into a twin-screw reaction extruder along with a suitable chain extender. At the end of reactive extrusion the polymer strands are pelletized for further needs. In a preferred embodiment the chain extender and the polyester each of which has been previously heated, are first mixed and the resulting mixture is mixed with heated diisocyanate. This method is preferred for the reason that the extender and the polyester will not react prior to the introduction of the diisocyanate and rapid mixing with the diisocyanate is thus facilitated. The mixing of the polyester, the chain extender and diisocyanate may be suitably carried out by using any mechanical mixer such as one equipped with a stirrer which results in intimate mixing of the three ingredients in a short period of time. If the material begins to become too thick, either the temperature may be lowered or a small amount of citric acid or the like from about 0.001 to about 0.050 parts by weight based on 100 parts of the polyester may be added to slow down the reaction. Of course, to increase the rate reaction, any suitable catalyst may be added to the reaction mixture such as tertiary amines and the like as set forth in the U.S. Pat. Nos. 2,620,516, 2,621,166 and 2,729,618. The reaction mixture, after complete mixing, is conducted onto a suitable heated surface or poured onto a table or conveyor and preferably maintained at a temperature of from about 60° C. to about 135° C. until it solidifies, e.g., into a slab so that it is still a thermoplastic and can be easily removed and reduced to the desired particle size. To facilitate the ready removal of the material from the hot plate, the table, conveyor or other surface, the slab or other physical form may be cut or scored while it is still soft to permit removal in a number of pieces rather than as a unit. This cutting or scoring is best done while the reaction mixture is soft, for when the material hardens it becomes difficult to cut although it can still be readily reduced in sized by grinders, choppers and other equipment known in the industry.

After the reaction mixture has reacted to form a hard product which is suitable for cutting, chopping or grinding, it is cooled to room temperature. This material may then be either stored for several weeks, if desired, or it may be immediately further processed after blending with the polyacrylate processing aid and if desired, the other thermoplastic material, by extrusion compression molding, injection molding or other similar techniques known in the industry.

Although adipate polyesters are preferred, polyesters may be used which are based on succinic acid, suberic acid, sebacic acid, oxalic acid, methyl adipic acid, glutaric acid, pimelic acid, azelaic acid, phthalic acid, terephthalic acid, isophthalic acid and the like.

A polyether may be used instead of the polyester in the preparation of the thermoplastic polyurethane and preferably polytetramethylene glycol having an average molecular weight between about 600 and 2000 and preferably about 1000. Other polyethers such as polypropylene glycol, polyethylene glycol and the like may be used providing their molecular weight is above about 600.

The above and other thermoplastic polyurethanes such as disclosed in U.S. Pat. Nos. 2,621,166, 2,729,618, 3,214,411, 2,778,810, 3,012,992, Canadian Patent Nos. 754,233, 733, 577 and 842,325 all incorporated herein by reference may be used to produce the thermoplastic polyurethanes composition herein.

Among the thermoplastic polyurethane elastomers commercially available for use in the thermoplastics of Mobay Chemical Corporation. These thermoplastic polyurethanes characteristically contain the urethane structure represented by the following formula:

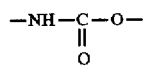

In some special cases when a diamine is used as the chain extender, a polyurethane-urea will result. The urea structure is represented by the formula.

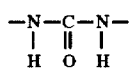

Most preferably, the polyurethanes useful in the present invention have Shore hardnesses (ASTM D2240) between about 70 on the "A" scale and 60 on the "D" scale.

Physical properties of various grades of polyurethanes are found in Saunders and Frisch, Polyurethanes, Chemistry and Technology, Interscience Publishers, Part II Technology, p. 83, Table XLVI; and in An Engineering Handbook of TEXIN Urethane Elastoplastic Materials, Mobay Chemical Corporation, Pittsburgh, Pa.

The ionic copolymers, ionomers, suitable in the context of the present invention are known in the art and are available in commerce. In this connection particular mention is made of the article Ionomers: The Sodium Salt of Poly (ethylene-co-Methacrylic Acid) by Keling Han and H. Leverne Williams, in the Journal of Applied Polymer Science, Vol 38, 73–86 (1989), incorporated herein by reference, which includes a description of the preparation of sodium neutralized ionomers. Also incorporated by reference is the specification in U.S. Pat. No. 3,264,272 which relates to the preparation of ionic copolymers.

The ionomer comprise a salt of a copolymer of an alpha olefin and an alpha, beta ethylenically unsaturated carboxylic acid. The olefin has the general formula

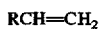

where R is selected from the group consisting of phenyl, hydrogen and alkyl having 1 to 8 carbon atoms, the olefin content of said copolymer being at least 50 weight percent based on the polymer, and the alpha, beta ethylenically unsaturated carboxylic acid has 1 or 2 carboxylic acid groups. The acid monomer content of said polymer being from 1 to 30, preferably 10 to 20 weight percent based on the polymer. The carboxylic acid—contains polymer containing uniformly distributed throughout the polymer at least one mono-valent alkali metal ion. The quantity of the metal ion being sufficient to neutralize at least 10 percent of said carboxylic acid.

Among the suitable alpha-olefin polymers mention may be made of ethylene, propylene, butylene, pentene-1, hexene-1, heptene-1, 3-methylbutene-1, 4-methylpentene-1 and mixtures thereof including mixtures of ethylene/propylene, ethylene/butylene, propylene/butylene and the like.

The second essential component of the base copolymer comprises an alpha, beta ethylenically unsaturated carboxylic acid group containing monomer having preferably 3 to 8 carbon atoms. Examples of the acid component of the copolymer of the invention include members selected from the group consisting of acrylic acid, methacrylic acid, maleic acid, maleic anhydride, acrylamide, methacrylamide, glycidyl acrylate, glycidyl methacrylate, vinyl acetate, vinyl butyrate methyl acrylate, ethyl acrylate, and the like.

The concentration of the alpha olefin is at least 50 weight percent, preferably 70 to 99, more preferably 75 to 90 weight percent and a complementary amount of units derived from a carboxylic acid said percents being relative to the weight of the copolymer.

The molecular weight (weight average) of the copolymer is about 1,000 to about 200,000, preferably 2,000 to 80,000.

The carboxylic acid units are at least partially, preferably 1 to 100 percent, most preferably 40 to 100 percent, neutralized by mono valent metal ions—counter ions. The preferred counter ions are alkali metal ions, preferably Li, Na or K ions.

The carboxylic acid groups of the copolymer of the invention are neutralized by reacting the polymer with an ionizable metal compound to obtain the metal salt—ionomer. The degree of neutralization and the metal ion may vary within certain prescribed limits in accordance with the invention.

The metal ions are mono valent alkali metal ions, preferably Li, Na and K, and the degree of neutralization may vary from about 1 to 100 percent relative to the acid group present in the copolymer.

The ionomer of the invention is preferably a random copolymer of polyethylene or polypropylene and sodium-neutralized methacrylic acid. In the preferred embodiment, the ionomer is about 50% neutralized.

Experimental

In demonstrating the invention experiments were conducted aimed at determining the relative effect of various additives on the processability of thermoplastic polyurethane (herein TPU). In the tables below there are presented summaries of the findings. In the experiments described below, the amount of torque necessary to process a given amount of TPU-based composition in a given time has been taken as a measure inversely proportional to the processability of the composition. The torque measurements reported below were conducted at 190° C., using a Haake-Buchler System 90 rheometer. Once the temperature was reached, the dry mixed polymer (e.g. TPU and ionomer) was fed into the Haake-Buchler Rheomix mixer Model 600 using the roller blade attachment normally used for viscous materials. The volume of the material in the chamber was kept constant at 50 ml. Temperature and torque were recorded as a function of time. The polyester based TPU used in the experiments was Texin 480A and the polyether based TPU was Texin 985A, both resins are products of Miles Inc.

TABLE 1

| | | Ionomer | | polyolefin[1] | |
|---|---|---|---|---|---|
| | added agent wt. % | Torque NM | Fusion time (minutes) | Torque NM | Fusion time (minutes) |
| TPU-polyester based | 0 | 4.82 | 0.6 | 4.82 | 0.6 |
| | 2 | 2.27 | 0.6 | 0.0 | >10 |
| TPU-polyether based | 0 | 2.90 | 0.6 | 2.90 | 0.6 |
| | 2 | 2.19 | 0.6 | 2.88 | 3.1 |

[1]the polyolefin used in the experiment was Epolene (supplied by Eastman Kodak) which is a carboxylic acid containing polyolefin having a molecular weight of about 2,000 to 4,000.

The table below, Table 2, includes data showing torque as a function of the amount of the ionomer in polyester based TPU. In the examples reported in the table "S" denotes an ionomer which is a random copolymer consisting of about 85 wt. % methacrylic acid which is neutralized, about 50%, by a counter ion. The molecular weight of "S" is in the order of 20,000 to 50,000.

The ionomer denoted as "A" is largely similar to "S" except that its molecular weight is about 2,000 to 4,000.

TABLE 2

|  | % ionic polyethylene added to the TPU | | | |
|---|---|---|---|---|
|  | 0 | 2 | 5 | 10 |
| ionomer S* | 4.82 | 2.27 | 2.27 | 3.29 |
| ionomer A* | 4.82 | 3.10 | 2.60 | 2.51 |

*Sodium neutralized.

A summary of further work aimed at determining the effect on the processability (measured as torque) of several compositions is presented below. In the table there is presented the torque data (in NM) of several compositions, each containing 5 wt % ionomer. The ionomers differed one from the other in terms of their counter ions and the relative methacrylic content and melt index.

TABLE 3

|  | added ionomer[3] | | | | | | |
|---|---|---|---|---|---|---|---|
|  | none | 1 | 2 | 3 | 4 | 5 | 6 |
| Relative melt index of ionomer* |  | 14.0 | 5.5 | 1.0 | 10.0 | 3.0 | 1.0 |
| TPU-polyester based | 4.82 | 6.18 | 6.18 | 6.70 | 2.74 | 2.27 | 2.92 |
| TPU-polyether based | 2.90 | 3.57 | 3.16 | 3.15 | 2.32 | 1.99 | 2.43 |

*ionomer S

3—the ionomers used in the experiments are characterized as follows:
1, 2 and 3 were neutralized by Zn, and 4, 5 and 6 were Na-neutralized.

The data tabulated below show the effect of the counter ions on the processability of the composition. In this set of experiments there was added to the compositions noted below 2 weight percent of the ionomer "A".

TABLE 4

|  | 7 (control) no additive | 8 | 9 | 10 | 11 |
|---|---|---|---|---|---|
| Counter-ion |  | Na$^+$ | Ca$^{++}$ | Mg$^{++}$ | Zn$^{++}$ |
| TPU-polyester based | 4.82 | 3.1 | 4.9 | 5.3 | 6.4 |
| TPU-polyether based | 2.90 | 2.60 | 2.75 | 3.04 | 3.15 |

In accordance with the results tabulated above, the torque values, inversely proportional to the processability of the composition, are significantly improved with the inclusion of mono-valent-neutralized ionomers. The ionomers used in examples 8–11 were similar one to the other except for the counter-ions which were as indicated in the table, all the ionomer were partially neutralized, at about 50%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition having lowered torque requirement entailed in it thermoplastic processing comprising
    (i) a polyester-polyol based-polyurethane resin, and
    (ii) about 0.1 to 5 percent relative to the total weight of said composition of an ionomer comprising a salt of a copolymer of 70 to 99 percent relative to the weight of the copolymer of alpha-olefin and about 1 to 30 percent relative to the weight of the copolymer of alpha, beta-ethylenically unsaturated carboxylic acid, wherein at least some of said carboxylic acid is neutralized by a monovalent counter ion selected from the group consisting of Li$^+$, Na$^+$ and K$^+$,
said copolymer having a weight average molecular weight of 1,000 to 200,000, said lowered torque requirement being in comparison to a corresponding composition which contains no ionomer.

2. The composition of claim 1 wherein said molecular weight is about 20,000 to 80,000.

3. The composition of claim 1 wherein said carboxylic acid is (meth)acrylic acid.

4. The composition of claim 1 wherein said olefin is ethylene.

5. A method of lowering the torque requirement in the thermoplastic processing of a molding composition containing a polyester polyol-based thermoplastic polyurethane resin comprising incorporating in said resin about 0.1 to 5 percent of an ionomer, said percent being relative to the total weight of said composition, said ionomer comprising a salt of a copolymer of 70 to 99 percent relative to the weight of the copolymer of alpha-olefin and about 1 to 30 percent relative to the weight of the copolymer of alpha, beta-ethylenically unsaturated carboxylic acid, wherein at least some of said carboxylic acid is neutralized by a monovalent counter ion selected from the group consisting of Li$^+$, Na$^+$ and K$^+$, said copolymer having a weight average molecular weight of 1,000 to 200,000, said lowering being in comparison to a corresponding composition which contains no ionomer.

6. The method of claim 5 wherein said molecular weight is about 20,000 to 80,000.

7. The method of claim 5 wherein said carboxylic acid is (meth)acrylic acid.

8. The method of claim 5 wherein said olefin is ethylene.

* * * * *